United States Patent [19]

Supplee et al.

[11] Patent Number: 5,401,313

[45] Date of Patent: Mar. 28, 1995

[54] SURFACE MODIFIED PARTICLES AND METHOD OF MAKING THE SAME

[75] Inventors: William W. Supplee, Hampton, N.J.; James T. Will, Jr., Easton, Pa.

[73] Assignee: Harcros Pigments, Inc., Fairview, Ill.

[21] Appl. No.: 16,819

[22] Filed: Feb. 10, 1993

[51] Int. Cl.⁶ ............................................. C04B 14/02
[52] U.S. Cl. .................... 106/712; 106/429; 106/445; 106/447; 106/448; 106/454; 106/459; 106/460; 106/465; 106/471; 106/475; 106/476; 106/477; 106/479; 106/487; 106/490; 106/491; 430/106.6
[58] Field of Search ............... 106/712, 459, 460, 424, 106/426, 428, 429, 431, 434, 435, 438, 439, 440, 441, 442, 443, 445, 447, 448, 454, 465, 471, 475, 476, 477, 479, 487, 490, 491; 430/106.6

[56] References Cited

U.S. PATENT DOCUMENTS

| | | | |
|---|---|---|---|
| 3,068,109 | 12/1962 | Rodeffer | 106/709 |
| 4,053,325 | 10/1977 | Vanderheiden | 106/456 |
| 4,204,876 | 5/1980 | Bowden | 106/645 |
| 4,753,679 | 6/1988 | Damiano et al. | 106/664 |
| 4,946,505 | 8/1990 | Jungk | 106/712 |
| 4,952,617 | 8/1990 | Ayala et al. | 523/200 |
| 4,978,483 | 12/1990 | Redding, Jr. | 264/4.32 |
| 5,059,250 | 10/1991 | Burrow et al. | 106/459 |
| 5,244,649 | 9/1993 | Ostertag et al. | 423/633 |

FOREIGN PATENT DOCUMENTS

| | | |
|---|---|---|
| 1283254 | 4/1991 | Canada. |
| 0262503 | 1/1989 | European Pat. Off. . |
| 2023559 | 9/1982 | United Kingdom . |

*Primary Examiner*—Mark L. Bell
*Assistant Examiner*—Scott L. Hertzog
*Attorney, Agent, or Firm*—Eckert Seamans Cherin & Mellott

[57] ABSTRACT

This invention relates to modifying the surface of particles for improved dispersion characteristics in aqueous, solvent, resinous, polymeric, cementitious or the like application systems. In particular, this invention relates to a pigment or filler particle whose surface is coated with at least one electric charge modifying agent and at least one dispersion promoting agent, which has improved dispersibility, coloring, handling, and other processing properties in application systems. The electric charge modifying agent may be selected from the group of Mg, Ca, Ba, Sr, Ti, V, Zr, Cr, Mn, Fe, Co, Ni, Cu, Zn, and Al. The dispersion promoting agent may be selected from the group of stearates, acetates, alkylphenols, cellulosics, waxes, lignins, polyacrylics, polyepoxies, polyurethanes, polyethylenes, polystyrenes and polypropylenes, and polymers having functional groups of alcohols, glycols, aldehydes, amides and carboxylic acids. Iron oxide is the preferred pigment particle.

71 Claims, No Drawings

SURFACE MODIFIED PARTICLES AND METHOD OF MAKING THE SAME

BACKGROUND OF THE INVENTION

1. Field of the Invention

This invention relates to modifying the surface of particles for improved dispersion characteristics in aqueous, solvent, resinous, polymeric, cementitious, magnetic or the like application systems. In particular, this invention relates to a pigment or filler particle whose surface is coated with at least one electric charge modifying agent which may also be combined with at least one dispersion promoting agent, which has improved dispersibility, coloring, handling, and other processing properties in application systems. Even more particularly, this invention relates to an iron oxide pigment particle whose surface is coated with at least one inorganic electric charge modifying material and at least one dispersion promoting material.

2. Prior Art

Inorganic pigments such as metal oxides, for example, iron oxides, are conventionally used as coloring components in the construction, paint, plastic and other industries. The inorganic pigments are incorporated for coloring into the desired application system such as, aqueous, solvent, resinous, polymeric, cementitious or dispersion systems or the like usually through intensive mixing. A key performance property of the pigment is the dispersibility of the pigment throughout the application system. The dispersibility is a measure of the ease with which the pigment particles can be uniformly and intimately mixed in the application system. Poor dispersion of the pigment particles can cause large agglomerates of pigment particles which may result in surface imperfections, color streaks, non uniform coloration or incomplete color development within the end product.

A problem with many inorganic pigments, for example, metal oxides, is that they normally do not disperse well in mediums such as in paints, plastics, cements or the like. A reason for this is that the surface of metal oxide pigments is not electrochemically compatible with many application systems and as a result, additional time, greater mechanical energy, and greater pigment quantities are required to properly mix the pigment in the medium to achieve the desired color and other properties.

Attempts have been made to provide a pigment particle with enhanced dispersion and coloring properties for many application systems. Among the prior art, surface modifications of inorganic pigment particles by coating the particles with inorganic additives are known for improving coloring and processing properties in several application systems. European Patent No. 87113450.8 - Burow et al. and U.S. Pat. No. 5,059,250 - Burow et al. disclose coating iron oxide pigment particles with colorless inorganic additives selected from the group of Mg, Zn, Al, La, Y, Zr, Sn and Ca. The isoelectric point of the coated particles is thereby adjusted by the coating to be greater than 7 which Burow et al. claim improves the coloring properties of the pigment in many application systems.

U.S. Pat. No. 4,053,325 - Vanderheiden discloses a iron oxide particle coated with an insoluble metal metaphosphate of the formula $M(PO_3)_x$, where M is a metal selected from the group of Al, Ba, Ca, Mg, Fe and Zn, this coated particle is claimed to improve the thermal stability of the pigment in many application systems.

It is also known, to treat inorganic particles with specific organic materials to improve certain performance characteristics in many application systems. U.S. Pat. No. 4,753,679 - Damtano et al. disclose a method for improving the strength and water permeability of concrete using inorganic particles, such as iron oxide, which have been pretreated with a fatty acid, such as stearic acid or oleic acid, to promote the dispersal of the particles in concrete systems.

U.S. Pat. No. 4,952,617 - Ayala et al. disclose surface modified inorganic pigment particles coated with an organic surfactant for improved dispersibilty and heat stability in both water based and organic solvent coating systems.

U.S. Pat. No. 4,946,505 - Jungk discloses a method of dyeing concrete using a specific binder physically combined with pigment particles, such as iron oxide, into a granule bead. However, these modified pigment particles suffer from the shortcoming that the dispersal of the pigments is dependent on the dissolution of the granule beads, or in other words, the dissolution of the pigment particles from the binder. Hence, the dissolution may occur prior to the pigment being dispersed in the concrete systems. The level of attachment of the pigment particle to the binder is, therefore weak, the pigment being only physically combined or encapsulated within the binder.

Despite the many prior attempts at improving pigment particle performance in a variety of application systems, more effective means are constantly being sought. It would be desirable to provide particles, namely pigment or filler particles, which have been surface modified to improve the particle performance in all application systems. It would also be desirable to be able to electrochemically and chemically modify, adjust or control a particle surface to provide a particle which has improved processing properties, such as dispersibility. It would also be desirable to specifically design the surface modification on the particle to be compatible with any desired application systems. It would also be desirable to provide a generic method for surface modification that is applicable to all particles and compatible with all application systems.

SUMMARY OF INVENTION

It is an object of the invention to provide a pigment or filler particle with an application-specific electrochemical and chemical designed surface modification to optimize particle performance in many application systems.

It is another object of the invention to provide a pigment or filler particle, whose surface is coated with at least one electrochemical or charge modifying agent and at least one dispersion promoting agent, for enhanced processing properties such as dispersibility or coloring properties in many application systems.

It is another object of the invention to electrochemically attach a dispersant to the surface of a pigment or filler particle.

It is another object of the invention to provide surface modified pigment or filler primary particles.

It is another object of the invention to provide low dusting freely flowable surface modified pigment or filler particles.

It is another object to provide a generic method for the surface modification of pigment or filler particles to improve processing properties in many application systems.

These and other objects of the invention are met by a surface modified pigment or filler particle having at least two coatings, an electrochemical or charge modifying coating and a dispersion promoting coating and a method for making the same. The invention further provides a generic systems approach for achieving optimal performance of a variety of particles, pigments or fillers or the like, in the desired application system through electrochemical and chemical surface modification of the particle.

The invention recognizes that the modifications of particle surface charge and chemistry enhance the particle performance in application systems. The invention further recognizes that the electrical surface charge associated with a particle at the dispersion medium interface of the application system leads to mutual particle repulsion or attraction in the application system. Thus, a particular electrochemical and chemical surface modification of the particle can be designed to improve the stabilization or attraction of the particle to other elements in any particular dispersion medium. Therefore, a determination of the overall electrochemistry of a desired application system allows a particle to be modified through electrochemical and chemical design to optimize particle performance in that system.

These and other advantages of the invention will become more apparent in connection with the following description of certain embodiments of the invention as disclosed in non-limiting examples.

DETAILED DESCRIPTION OF THE PREFERRED EMBODIMENTS

The invention concerns the modification of particle surface electrochemistry and chemistry to improve the particle performance in a variety application systems, such as paints, coatings, resinous, cementitous, magnetic, aqueous, solvent and other systems or the like. It has not been taught or suggested prior to this invention that a pigment particle or filler particle may be surface modified through electrochemical and chemical adjustment to improve various performance characteristics of these particles in a variety of application systems. The importance of charge adjusted particles is particularity realized by the ability to specifically and systematically design particles which are chemically and electrochemically compatible with a particular application system.

The present invention is, therefore, directed to a composition which comprises a pigment particle or filler particle coated with at least two coating materials, one being a charge or electrochemical modifying agent and the other being a dispersion agent for promoting dispersal of the pigment particles in a particular application system and a method for making the same.

The particle to be modified is a pigment or a filler particle. The pigment particle or filler particle may be inorganic or organic and selected from the group of minerals, organics, laked organics, extenders, fillers, metals, and metal oxides or the like. Other Examples of pigments and fillers are disclosed in the Pigment Handbook, Vols. I and III, Temple C. Patton, Editor, John Wiley & Sons, New York, latest edition.

More specifically, the pigment particles may include chromates, ferrocyanides, sulfides, sulfoselenides, oxides, silicas, silicates, phosphates, aluminates, titanates, carbonates, sulfates, borates, organic pigments and metal pigments. Inorganic pigment particles, such as metal oxides, for example, iron oxide, are often preferred, because of their low cost and compatibility in many application systems. Other metal oxides such as aluminum oxide, chromium oxide, lead oxide, nickel oxide, silicon oxide, silver oxide, tin oxide, titanium oxide, zinc oxide, zirconium oxide and other transition metal oxides can also be used, The pigment or filler particles typically have an average primary particle size of from about 0.01 to 100 microns, usually 0.01 to 50 microns. It is preferred that each primary particle receive the surface modification according to the invention, although a group of previously agglomerated particles may also receive the surface modification.

Although the theory behind this invention is not completely understood, the surface modified particles of this invention provide improved performance properties in a variety of application systems as the result of specific electrochemical and chemical particle surface modification to fit a particular application. This invention is, therefore, premised on the discovery that the surface modified particles can be designed for desired performance characteristics in a particular application system by modifying the electrochemical and chemical condition of the particle surface. The surface modification provides improved particle to particle and particle to application system interaction.

The pigment or filler particle is surface modified or coated with at least one electrochemical or charge modifying agent and with at least one dispersion promoting agent, thereby electrochemically and chemically attaching at least two agents to the surface of the particle to enhance the properties of the particle in the application system.

It is believed that the electrochemical or charge modifying agent electrochemically modifies or adjusts the surface charge of the pigment or filler particle. In addition, it is further believed that the electrochemical or charge modifying agent provides a site on the particle surface to facilitate the electrochemical or chemical attachment, bonding or interfacing of the dispersion promoting agent. Through such surface modification, using two different agents together, a particle may be specifically designed to be electrochemically and chemically compatible with many application systems.

The electrochemical or charge modifying agent can be selected from the group of Mg, Ca, Ba, Sr, Ti, V, Zr, Cr, Mn, Fe, Co, Ni, Cu, Zn, Si and Al or any mixtures thereof. The electrochemical or charge modifying agent can also include other inorganic materials or organic materials.

The electric charge of the pigment or filler particle, dictates whether the electrochemical or charge modifying agent coating is a cationic or anionic material. Typical pigment particles, such as iron oxides, are generally electronegative particles, and therefore combine more readily with cationic charge modifying agents. Other pigment particles, such as barium sulfate, are generally electropositive particles and therefore combine more readily with anionic charge modifying agents.

The following invention will, therefore, be discussed with respect to electronegative pigment or filler particles, such as an iron oxide, although the invention is not limited to this embodiment. Electropositive or neutral particles also may be surface modified according to the invention.

The electronegative particle is surface modified with at least one electrochemical or charge modifying agent, which is preferably a cationic coating material for the electronegative particle. The electrochemical or charge modifying cationic coating material may be organic or inorganic. The electrochemical or charge modifying agent for iron oxide is preferably a soluble inorganic cationic material, which is selected from the group of Mg, Ca, Ba, Sr, Ti, V, Zr, Cr, Mn, Fe, Co, Ni, Cu, Zn, Si and Al or any mixtures thereof. The inorganic coating of the compounds of the group Mg, Ca, Ba, Sr, Ti, V, Zr, Cr, Mn, Fe, Co, Ni, Cu, Zn, Si and Al or any mixtures thereof is carried out preferably by precipitating at least one of the compounds on the surface of the particle to thereby form a surface electrochemically or charge modified particle. As described above, the electrochemical or charge modifying agent may also be an anionic material preferably for coating an electropositive particle.

The electrochemical or charge modifying coating is placed on the pigment particle in the range of 0.01–20% by weight of the pigment particle, preferably in the range of 0.02–5% by weight.

The surface charge modified particle formed is then combined with a second dispersion promoting coating, namely at least one dispersion promoting agent for promoting dispersal of the particle in a desired application medium. The surface charge adjusted particle is electrochemically and chemically designed to interface with the at least one dispersion promoting agent as desired for the particular application system to facilitate electrochemical attachment of the dispersion promoting agent to the particle. It is believed that the dispersion promoting agent coating is electrochemically or chemically attached to the particle through the electrochemical surface adjustment of the particle. This two step surface modification of the particle according to the invention provides a particle with optimal performance capabilities not yet disclosed or suggested prior to this invention.

The dispersion promoting agent is specifically designed to be chemically compatible and stable in the selected application system, such as in solvent, aqueous, paints, coatings, resins, cementitious and the like. Depending on the particular application system, the dispersion promoting agent may contain polar or nonpolar groups to provide electrochemical and chemical compatibility in the particular application system. For example, lignin sulfonate is a known dispersion agent used in cementitious application systems that is readily absorbed in the crystalline phases of concrete formation and enhances dispersal of a pigment particle associated therewith.

The dispersion promoting agent may be an anionic, cationic or non-ionic material, preferably having an opposite charge to the charge modifying agent, to promote the electrochemical or chemical attachment thereto. The invention being previously discussed with respect to an electronegative pigment particle and a cationic electrochemical or charge modifying agent, it follows that an anionic dispersion agent is discussed below although the invention is not limited to this embodiment.

The dispersion promoting agent coating is preferably an organic anionic material and may be selected from organic compounds taken from the Group of stearates, acetates, alkylphenols, cellulosics, waxes, lignins, acrylics, epoxies, urethanes, ethylenes, styrenes, propylenes and polymers with functional groups of alcohols, glycols, aldehydes, amides and carboxylic acids, or any mixture thereof. The dispersion promoting agent coating may also be inorganic anionic material selected from the group of silicates, silanes, siloxanes, phosphates, sulfates, sulfonated compounds, titanates, and any mixtures thereof.

The dispersion promoting agent coating is placed on the previously coated pigment particle in the range of 0.01–20% by weight of the pigment particle, preferably in the range of 0.02–5% by weight. The dispersion promoting agent is electrochemically or chemically attached to the previously charged modified particle to yield the surface modified particle of the present invention.

The isoelectric point (pH at which the net charge on a molecule in solution is zero and therefore does not move in an electric field) of the surface modified particle coated with the at least one electrochemical or charge modifying agent and at least one dispersion promoting agent, i.e., at least two coatings, can be designed to be the most compatible in the particular application system desired.

Conventional pigment particles and application systems rely on either electrochemical surface control alone or encapsulation of the pigment particle in a dispersion agent. The present invention through a two step synergistic electrochemical and chemical surface modification of the pigment or filler particle electrochemically or chemically attaches the dispersion agent to the particle and provides an improved dispersion in many systems.

The surface modified particle of this invention is used in the application system in the range of about 0.1–80% by weight of application system vehicle or pigment carrier, preferably 0.2–60% by weight, and most preferably 0.5–40% by weight. Examples of application systems for this invention include aqueous or solvent coatings, resins, polymers, cements, toners and dispersions or the like. The method of incorporation of the surface modified designed particle of this invention is dependent on the type of application system.

The surface modified particle according to the invention can be used to improve particle performance such as coloring in cementitious application systems and thereby form a colored cement. An improved process for coloring a cement can be accomplished by mixing a surface modified pigment, such as metal oxides, preferably iron oxide, having a surface coating of at least one electric charge modifying agent and at least one dispersion promoting agent, with hydraulic cement, portland cement or the like, aggregate, water and other additives at conditions sufficient to result in an improved homogeneous dispersal of the pigment particles in the cementitious application system. Preferably, the dispersion promoting agent is sodium lignosulfonate in solution. U.S. Pat. No. 4,753,679 - Damiano et al. disclose cementitious systems which is incorporated by reference herein.

The surface modified particle according to the invention can further be used to improve particle performance such as coloring in aqueous or organic coating, resin or paint application systems and thereby form a colored coating, resin or paint. An improved process for coloring coatings, resins or paints can be accomplished by mixing a surface modified pigment, such as metal oxides, preferably iron oxide, having a surface coating of at least one electric charge modifying agent and at least one dispersion promoting agent, with vehicle, binder, base and other additives at conditions sufficient to result in an improved homogeneous dispersal of the pigment particles in the coating, resin or paint application system. U.S. Pat. No. 4,952,617 - Ayala et al. disclose resin and coating systems which is incorporated by reference herein.

The surface modified particle according to the invention can also be used to improve particle performance in magnetic applications such as ferromagnetic toner or ink application systems. An improved toner can be formed from magnetic particles such as black iron oxide particles having a surface coating of at least one electric charge modifying agent and at least one dispersion promoting agent and other additives. The surface modification according to the invention imparts hydrophobicity to the black iron oxide particles to result in improved particle performance in magnetic ink or toner application systems. In general, magnetic toner particles are attracted to magnetic surfaces to produce a magnetic image on the surface. Magnetic toners have been employed to develop magnetic images recorded on magnetic tapes, films, drums, printing plates. Magnetic toners are especially used in copying machines. U.S. Pat. No. 4,336,546 - Edwards et al. disclose a magnetic printing apparatus and magnetic toner compositions which is incorporated by reference herein.

The method for production of the surface modified pigment or filler particle according to this invention includes providing the pigment or filler particle in suspension in an aqueous or solvent continuous phase. It is preferred and advantageous that the particle is provided in an in-process suspension during the manufacturing of the particles, prior to their recovery and agglomeration. An in-process suspension of particles is preferred since it is an optimal condition to treat the primary particles of the filler or the pigment individually and thus provide each primary particle with a surface modification according to the invention. However, the pigment or filler particle may be provided in a previously dried form which then must be redispersed or resuspended in a continuous phase.

The pigment or filler particle suspension is charged into a vessel or the like and is preferably agitated mechanically to maintain the dispersed phase in suspension. Thereafter, the electrochemical or charge modifying agent is added to the tank.

The electrochemical or charge modifying agent, i.e., cationic or anionic and inorganic or organic materials, may be added to the tank in solution, in suspension or solid form. The charge modifying agent is preferably precipitated onto the surface of the primary particles in suspension through further agitation of the tank and may also be precipitated through pH adjustment of the mixture to a pH of about 7-11, preferably 8-11, most preferably 9-10, until substantially complete precipitation occurs. The agitating and pH adjusting, promotes the chemical bonding of the electrochemical or charge modifying agent coating to the primary particle surface and further electrochemically modifies the surface charge of the particle to provide an electrochemical site for the second dispersion promoting agent coating to be interfaced or electrochemically or chemically attached thereto.

The dispersion promoting agent, i.e., anionic, cationic, or non-ionic and inorganic or organic materials, may also be added to the tank in solution, suspension, or solid form. The tank is further agitated until substantially complete interfacing or electrochemical attachment of the dispersion agent to the primary particle is achieved, thereby electrochemically and/or chemically fixing or interfacing the dispersion agent to the surface of the particle and producing the surface modified particle according to this invention. The dispersion promoting agent may be added to the tank prior to adding the charge modifying agent, but preferably subsequently thereto.

The surface modified particle may be recovered by conventional recovery processes, such as filtration and drying, batch drying, spray roasting, spray drying, and fluidized bed drying or the like. The surface modified particle may further be sized concurrently with the recovery process or in an additional sizing step, such as spray drying a mixture of the recovered surface modified particle with a liquid such as water.

The surface modified particles according to the invention may be produced in powder, dispersion, or granular form. It is usually preferred that the particles be free flowing for optimal storage and handling, and therefore it is preferred that the surface modified particles of this invention be produced in granular form, preferably bead granules, with an average bulk particle size or an average agglomerated particle size in the range of 25 to 250 microns, preferably 100 to 200 microns, and a water content of less than 5%, preferably less than 2%.

The surface modified particle according to the invention can also include other additives such as stabilizers, dispersants, biocides, wetting agents, rheology modifiers, fillers, lubricants, plasticizers, plastisols, propellants, gas entrainment agents and the like.

In the Examples 1 through 9 discussed below, surface modified particles were produced according to the invention. Comparative testing was conducted for the effects of the surface modified particles according to the invention in specific application mediums to show improved dispersion and coloring properties as compared with surface modified particles or agglomerates as disclosed in the prior art.

EXAMPLE 1

Surface Modification Of Yellow Iron Oxide For An Aqueous Dispersion Application System A quantity of fully precipitated and color developed yellow iron oxide is accumulated such that 1120 dry equivalent gms of the yellow iron oxide are delivered to a 12 liter sized vessel as an in process material. The concentration of this in process material is approximately 0.12 gm/cc. The material is agitated with an impeller type agitation system at approximately 450 rpm or until suitable surface movement of the material is developed. From a 1 Molar solution of magnesium sulfate heptahydrate, 280 ml of the solution are added to the agitating pigment suspension over approximately a 5 minute interval. The agitation is continued for 15 minutes. From a 50% sodium hydroxide solution, a sufficient quantity is added to the pigment suspension in order to elevate the pH to approximately 9. Thereafter, a quantity of 26 gms on an active basis of a 3500 to 5500 molecular weight sodium salt of polyacrylate are added to the suspension. The suspension is agitated an additional 15 minutes. The particles are now accumulated and tested as compared to a control for chemical and dispersion characteristics.

TABLE I

| | Chemical Comparison | | | |
|---|---|---|---|---|
| Example | A | B | C | Example 1 |
| Powder pH | 8.03 | 6.59 | 8.57 | 8.51 |
| Magnesium Level | 0.012 | 0.01 | 0.136 | 0.124 |
| % Carbon | 0.17 | 1.36 | 0.19 | 0.69 |

TABLE II

| | Dispersion Characteristics Aqueous System | | | |
|---|---|---|---|---|
| Example | A | B | C | Example 1 |
| Oxide Loading Time | 18 min | 8 min | 15 min | 3 min |
| Maximum % Solids | 23.5 | 70.0 | 62.0 | 74.0 |
| Viscosity Brookfield 50 rpm #6 Spindle RVT (cps) | 10,000+ | 3,800+ | 10,000+ | 3,600 |
| Hercules A Bob 4400 rpm cm of deflection where, | Abort | 5.5 | Abort | 2.90 |

Example A = A control of an untreated precipitated yellow iron oxide;
Example B = The yellow iron oxide treated with a one step organic coating of sodium salt of polyacrylic acid; and,
Example C = The yellow iron oxide treated with a one step inorganic magnesium sulfate heptahydrate.

EXAMPLE 2

Surface Modification Of A Yellow Iron Oxide For A Coating System Dispersion Application A quantity of fully precipitated and color developed yellow iron oxide is accumulated such that 1120 dry equivalent gms of the yellow iron oxide are delivered to a 12 liter sized vessel as an in process material. The concentration of this in process material is approximately 0.12 gm/cc. The material is agitated with an impeller type agitation system at approximately 450 rpm or until suitable surface movement of the material is developed. From a 3 Molar sodium aluminate solution, 225 ml are added to the pigment suspension over approximately 5 minutes. The suspension is agitated an additional 15 minutes. From a 1 Molar sodium silicate solution, 280 ml are added to the agitated pigment suspension. The agitation is continued to for an additional 15 minutes. The particles are now accumulated and tested as compared to a control for chemical and dispersion characteristics.

TABLE III

| | Chemical Comparison | |
|---|---|---|
| Example | A | Example 2 |
| Powder pH | 8.03 | 4.50 |
| Aluminum Level | 0.05 | 0.33 |
| % Silicon | 0.03 | 0.63 |

TABLE IV

| Dispersion Characteristics: Long Oil Alkyd System Long Oil Alkyd (No Dispersant) (25 Minute Grind Data) | | |
|---|---|---|
| Example | A | Example 2 |
| Temp Degrees C. | 48 | 50 |
| Hegman 0-8 | 6+ | 6+ |
| Viscosity (cps) | 86,000 | 81,000 |

TABLE V

| Comparative Tint Data: Long Oil Alkyd* (25 Minute Color Development) Color Difference to Precursor Control | | |
|---|---|---|
| Example | A | Example 2 |
| Z Strength | 98.8% | 103.6% |
| DRG | −0.9 | 0.2 |
| DYB | −0.7 | 0.2 |
| DL | 0.7 | 0.0 |
| DE | 1.3 | 0.2 |

*All color data are measured with a Macbeth 2020+ Spectrophotometer (Illuminant D) and reported using the FMCII color difference convention.

EXAMPLE 3

A Surface Modification For Improved Performance Of A Yellow Iron Oxide Finished Goods Pigment In An Aqueous System Dispersion Process Application A quantity of 1120 gms of finished goods specifications dry yellow iron oxide are delivered to a 12 liter sized vessel containing 10,000 gms of Water. The material is agitated with an impeller type agitation system at approximately 450 rpm or until suitable surface movement of the material is developed. From a 1 Molar solution of magnesium sulfate heptahydrate, 280 ml of the solution are added to the agitating pigment suspension over approximately a 5 minute interval. The suspension is agitated for approximately 30 minutes. From a 50% sodium hydroxide solution, a sufficient quantity is added to the pigment suspension in order to elevate the pH to approximately 9. Thereafter, a quantity of 26 gms on an active basis of a 3500 to 5500 molecular weight sodium salt of polyacrylate are added to the suspension. The agitation is continued for 15 minutes. The particles are now accumulated and tested as compared to a control.

EXAMPLE 4

Surface Modification For Improved Performance Of A Yellow Iron Oxide Pigment In An Aqueous System Process Application A quantity of fully precipitated and color developed yellow iron oxide is accumulated such that 1120 dry equivalent gms of the yellow iron oxide are delivered to a 12 liter sized vessel as an in process material. The material is agitated with an impeller type agitation system at approximately 450 rpm or until suitable surface movement of the material is developed. From a 1 Molar solution of magnesium sulfate heptahydrate, 280 ml of the solution are added to the agitating pigment suspension over approximately a 5 minute interval. The suspension is agitated for approximately 30 minutes. From a 50% sodium hydroxide solution, a sufficient quantity is added to the pigment suspension in order to elevate the pH to approximately 9. Thereafter, a quantity of 26 gms on an active basis of a 3500 to 5500 molecular weight sodium salt of polyacrylate are added to the suspension. The agitation is continued for 15 minutes. The particles are now accumulated and tested as compared to a control.

TABLE VI

| Comparative Dispersion Characteristics Aqueous System Low Solids Grind | | | |
|---|---|---|---|
| Example | A | Example 3 | Example 4 |
| % Solids | 60.4 | 60.6 | 60.2 |
| Dispersion pH | 5.5 | 8.0 | 8.2 |
| Brookfield Viscosity | 3400 cps | 2200 cps | 1200 cps |

TABLE VI-continued

Comparative Dispersion Characteristics
Aqueous System Low Solids Grind

| Example | A | Example 3 | Example 4 |
|---|---|---|---|
| Oxide Loading Time | 9 min | 5 min | <3 min |

TABLE VII

Comparative Tint Data Latex Format*

| Color data Test Type Example | Latex Tint A | Latex Tint Example 3 | Latex Tint Example 4 |
|---|---|---|---|
| Z Strength % | 96.7 | 103.5 | 117.0 |
| DRG | −0.4 | −1.3 | 3.1 |
| DYB | −0.6 | −1.3 | 3.8 |
| DL | 0.9 | 0.0 | −2.2 |
| DE | 1.1 | 1.9 | 5.4 |

EXAMPLE 5

A Surface Modification For Improved Performance Of A Yellow Iron Oxide Pigment In A Cementitious Process Application A quantity of fully precipitated and color developed yellow iron oxide is accumulated such that 1120 dry equivalent gms of the yellow iron oxide are delivered to a 12 liter sized vessel as an in process material. The concentration of this in process material is approximately 0.12 gm/cc. The material is agitated with an impeller type agitation system at approximately 450 rpm or until suitable surface movement of the material is developed. From a 1 Molar solution of magnesium sulfate heptahydrate, 280 ml of the solution are added to the agitating pigment suspension over approximately a 5 minute interval. The agitation is continued for 15 minutes. From a 50% sodium hydroxide solution, a sufficient quantity is added to the pigment suspension in order to elevate the pH to approximately 9. The suspension is agitated for 15 minutes. To the suspension, 22.4 gms of a dry sodium lignosulfonate are added. The suspension is agitated for approximately 30 minutes. The particles are now accumulated and tested as compared to a control.

EXAMPLE 6

A Surface Modification For Improved Performance Of A Yellow Iron Oxide Pigment In A Cementitious Process Application A quantity of fully precipitated and color developed yellow iron oxide is accumulated such that 1120 dry equivalent gms of the yellow iron oxide are delivered to a 12 liter sized vessel as an in process material. The concentration of this in process material is approximately 0.12 gm/cc. The material is agitated with an impeller type agitation system at approximately 450 rpm or until suitable surface movement of the material is developed. From a 1 Molar solution of magnesium sulfate heptahydrate, 280 ml of the solution are added to the agitating pigment suspension over approximately a 5 minute interval. The agitation is continued for 15 minutes. From a 50% sodium hydroxide solution, a sufficient quantity is added to the pigment suspension in order to elevate the pH to approximately 9. The suspension is agitated for 15 minutes. To the suspension, 56.0 gms of a 40% sodium lignosulfonate solution are added. The suspension is agitated for approximately 30 minutes. The particles are now accumulated and tested as compared to a control.

TABLE VIII

Comparative Tint Data Latex Format*
Color Difference to Precursor Control

| | Example 5 | Example 6 |
|---|---|---|
| Z Strength | 97.7% | 107.7% |
| DRG | −2.1 | 2.6 |
| DYB | −3.0 | 1.7 |
| DL | 0.5 | −1.3 |
| DE | 3.7 | 3.3 |

TABLE IX

Comparative Concrete Color Development
Standard Concrete Mix Design
Example 6 v. Control

| Z Strength 30 second | 100.37% |
|---|---|
| Z Strength 45 second | 112.91% |
| Z Strength 60 second | 116.49% |
| Z Strength 120 second | 116.21% |

EXAMPLE 7

A Surface Modification For Improved Performance Of A Red Iron Oxide Pigment In A Cementitious Process Application A quantity of fully precipitated and color developed red iron oxide is accumulated such that 1120 dry equivalent gms of the red iron oxide are delivered to a 12 liter sized vessel as an in process material. The concentration of this in process material is approximately 0.12 gm/cc. The material is agitated with an impeller type agitation system at approximately 450 rpm or until suitable surface movement of the material is developed. From a 1 Molar solution of magnesium sulfate heptahydrate, 280 ml of the solution are added to the agitating pigment suspension over approximately a 5 minute interval. The agitation is continued for 15 minutes. To the suspension, add 560.0 gms of a 4% sodium lignosulfonate solution. The suspension is agitated for approximately 30 minutes. The particles are now accumulated and tested as compared to a control.

TABLE X

Comparative Tint Data Latex Format*
Example 7 v. Control

| Z Strength | 111.3% |
|---|---|
| DRG | 4.0 |
| DYB | 0.3 |
| DL | 3.5 |
| DE | 5.4 |

TABLE XI

Comparative Concrete Color Development
Standard Concrete Mix Design
Example 7 v. Control

| Z Strength 30 second | 103.51% |
|---|---|
| Z Strength 45 second | 115.64% |
| Z Strength 60 second | 121.48% |
| Z Strength 120 second | 122.35% |

EXAMPLE 8

A Surface Modification For Improved Performance Of A Black Iron Oxide Pigment In A Cementitious Process Application A quantity of fully precipitated and color developed black iron oxide is accumulated such that 1120 dry equivalent gms of the black iron oxide are delivered to a 12 liter sized vessel as an in process material. The concentration of this in process material is approximately 0.12 gm/cc. The material is agitated with an impeller type agitation system at approximately 450 rpm or until suitable surface movement of the material is developed. From a 1 Molar solution of magnesium sulfate heptahydrate, 280 ml of the solution are added to the agitating pigment suspension over approximately a 5 minute interval. The agitation is continued for 15 minutes. To the dispersion, 560.0 gms of a 4% sodium lignosulfonate solution is added. The suspension is agitated for approximately 30 minutes. The particles are now accumulated and tested as compared to a control.

TABLE XII

| Comparative Tint Data Latex Format* Example 8 v. Control | |
|---|---|
| Z Strength | 108.4% |
| DRG | 1.7 |
| DYB | 1.4 |
| DL | −2.9 |
| DE | 3.8 |

TABLE XIII

| Comparative Concrete Color Development Standard Concrete Mix Design Example 8 v. Control | |
|---|---|
| Z Strength 30 second | 102.21% |
| Z Strength 45 second | 111.41% |
| Z Strength 60 second | 113.51% |
| Z Strength 120 second | 115.21% |

EXAMPLE 9

A Surface Modification For Improved Performance Of A Black Iron Oxide Pigment In A Solvent Based Toner Application A quantity of fully precipitated and color developed black iron oxide is accumulated such that 681 dry equivalent gms of the black iron oxide are delivered to a 12 liter sized vessel as an in process material. The concentration of this in process material is approximately 0.12 gm/cc. The material is agitated with an impeller type agitation system at approximately 450 rpm or until suitable surface movement of the material is developed. A quantity of 2.1 gms of aluminum chloride is heated to 130° F. in 280 ml of water. Aluminum chloride solution is added to the slurry of black oxide. A quantity of 15.9 gms of sodium stearate is added from a dilute solution. The mixture is agitated for approximately 30 minutes. The particles are now accumulated and tested as compared to a control.

TABLE XIV

| Sample | Moisture Adsorption Analysis | | | | Total Wt Change gms |
|---|---|---|---|---|---|
| | 0 hrs | 24 hrs | 48 hrs | 72 hrs | |
| Control | 10.9975 | 11.0597 | 11.0945 | 11.0786 | +0.0811 |
| Example 8 | 10.9971 | 10.9938 | 10.9938 | 10.9943 | −0.0028 |

TABLE XV

| Sample | VSM Magnetic Properties | | |
|---|---|---|---|
| | Hc (Oe) | Sigma-m (emu/gm) | Sigma-r (emu/gm) |
| Control | 98 | 85.3 | 10.5 |
| Example 8 | 98 | 82.9 | 7.6 |

We claim:

1. A surface modified particle, comprising: a particle selected from the group consisting of pigments and fillers having an amorphous coating of at least one electric charge modifying agent and at least one dispersion promoting agent.

2. The surface modified particle according to claim 1, wherein said electric charge modifying coating is about 0.01–20% by weight of the pigment particle.

3. The surface modified pigment particle according to claim 1, wherein said dispersion promoting coating is about 0.01–20% by weight of the pigment particle.

4. A surface modified pigment particle, comprising: a pigment particle having an amorphous coating of at least one electric charge modifying agent and at least one dispersion promoting agent.

5. The surface modified pigment particle according to claim 4, wherein said pigments are selected from the group consisting of chromates, ferrocyanides, sulfides, sulfoselenides, oxides, silicates, phosphates, aluminares, titanates, carbonates, sulfates, borates and metal pigments.

6. The surface modified pigment particle according to claim 4, wherein said pigments are metal oxides.

7. The surface modified pigment particle according to claim 6, wherein said metal oxides are iron oxides.

8. The surface modified pigment particle according to claim 4, wherein said at least one electric charge modifying agent is an inorganic material selected from the group consisting of Mg, Ca, Ba, Sr, Ti, V, Zr, Cr, Mn, Fe, Co, Ni, Cu, Zn, Si and Al.

9. The surface modified pigment particle according to claim 4, wherein said at least one dispersion promoting agent is an organic material selected from the group consisting of stearates, acetates, alkylphenols, cellulosics, waxes, lignins, acrylics, epoxies, urethanes, ethylenes, styrenes, propylenes and polymers having functional groups of alcohols, glycols, aldehydes, amides and carboxylic acids.

10. The surface modified pigment particle according to claim 4, wherein said electric charge modifying coating is about 0.01–20% by weight of the pigment particle.

11. The surface modified pigment particle according to claim 4, wherein said dispersion promoting coating is about 0.01–20% by weight of the pigment particle.

12. The surface modified pigment particle according to claim 4, wherein said particle has an average primary particle size of 0.01–100 microns.

13. The surface modified pigment particle according to claim 4, wherein said surface modified pigment particle is in granular form.

14. The surface modified pigment particle according to claim 13, wherein said granule is a bead granule.

15. The surface modified pigment particle according to claim 13, wherein said granule has an average bulk particle size is in the range of 25 to 250 microns.

16. The surface modified pigment particle according to claim 15, wherein said granule has an average bulk particle size in the range of 100 to 200 microns.

17. The surface modified pigment particle according to claim 13, wherein said granule has a water content of less than 5%.

18. The surface modified pigment particle according to claim 17, wherein said granule has a water content of less than 2%.

19. The surface modified pigment particle according to claim 4, wherein said surface modified pigment particle is in powder form.

20. The surface modified pigment particle according to claim 4, wherein said surface modified pigment particle is in dispersion form.

21. The surface modified pigment particle according to claim 4, further comprising other additives.

22. A surface modified pigment particle, comprising:
a pigment particle selected from the group consisting of metal oxides having an amorphous coating of at least one electric charge modifying agent and at least one dispersion promoting agent, wherein said at least one electric charge modifying agent is an inorganic material selected from the group consisting of Mg, Ca, Ba, Sr, Ti, V, Zr, Cr, Mn, Fe, Co, Ni, Cu, Zn, Si and Al and said at least one dispersion promoting agent is an organic material selected from the group consisting of stearates, acetates, alkylphenols, cellulosics, waxes, lignins, acrylics, epoxies, urethanes, ethylenes, styrenes, propylenes and polymers having functional groups of alcohols, glycols, aldehydes, amides and carboxylic acids.

23. The surface modified pigment particle according to claim 22, wherein said pigment is iron oxide.

24. The surface modified pigment particle according to claim 22, wherein said particle has an average primary particle size of 0.01–100 microns.

25. The surface modified pigment particle according to claim 22, wherein said surface modified pigment particle is in granular form.

26. The surface modified pigment particle according to claim 25, wherein said granule is a bead granule.

27. The surface modified pigment particle according to claim 25, wherein said granule has an average bulk particle size is in the range of 25 to 250 microns.

28. The surface modified pigment particle according to claim 25, wherein said granule has a water content of less than 5%.

29. The surface modified pigment particle according to claim 22, further comprising at least one additive selected from the group consisting of stabilizers, dispersants, biocides, wetting agents, rheology modifiers, fillers, lubricants, plasticizers, plastisols, propellants and gas entrainment agents.

30. A method of coating the surface of a particle selected from the group consisting of pigments and fillers, comprising the steps of:
(a) providing a suspension of particles selected from the group consisting pigments and fillers in solution;
(b) adding at least one electric charge modifying agent to the suspension;
(c) precipitating an amorphous coating of said at least one electric charge modifying agent on the surface of said particles;
(d) adding at least one dispersion promoting agent to the suspension;
(e) electrochemically attaching at least one dispersion promoting agent to said particles; and,
(f) recovering the surface coated particles.

31. A method of coating the surface of a pigment particle comprising the steps of:
(a) providing a suspension of a pigment particles in solution;
(b) adding at least one electric charge modifying agent to the suspension;
(c) precipitating an amorphous coating of said at least one electric charge modifying agent on the surface of said pigment particles;
(d) adding at least one dispersion promoting agent to the suspension;
(e) electrochemically attaching said at least one dispersion promoting agent to said pigment particles; and,
(f) recovering the surface coated pigment particles.

32. The method according to claim 31, wherein said pigments are metal oxides.

33. The method according to claim 32, wherein said metal oxides are iron oxides.

34. The method according to claim 31, wherein said precipitating step is by agitating, pH adjusting to alkalinity or a combination thereof until substantially complete reaction.

35. The method according to claim 31, wherein said attaching step is by agitating until substantially complete reaction.

36. The method according to claim 31, wherein said recovering step is by filtration and drying, batch drying, spray roasting, spray drying or fluidized bed drying.

37. The method according to claim 31, wherein said suspension of particles is an in-process suspension.

38. The method according to claim 31, wherein said suspension of particles is a redispersion of agglomerated particles.

39. The method according to claim 31, further comprising the step of:
(g) granulating said surface coated particles to end product form.

40. The method according to claim 39, wherein said granulating step comprises spray drying with a liquid.

41. A colored cementitious composition, comprising:
a cement and surface modified pigment particles selected from the group consisting of metal oxides having an amorphous coating of at least one electric charge modifying agent and at least one dispersion promoting agent.

42. A magnetic toner composition, comprising:
surface modified pigment particles selected from the group consisting of metal oxides having an amorphous coating of at least one electric charge modifying agent and at least one dispersion promoting agent.

43. A coating composition, comprising:
a base, a vehicle, a binder and surface modified pigment particles selected from the group consisting of metal oxides having an amorphous coating of at least one electric charge modifying agent and at least one dispersion promoting agent.

44. A method of coloring cement, comprising the steps of:
(a) providing surface modified pigment particles selected from the group consisting of metal oxides having an amorphous coating of at least one electric charge modifying agent and at least one dispersion promoting agent;
(b) mixing said modified pigment particles with cement at conditions sufficient to form a homogeneous dispersal of said surface modified pigment particles in the cement; and, (c) allowing the cementitious mixture to set.

45. A surface modified iron oxide pigment, comprising:

an iron oxide pigment selected from the group consisting of red, yellow and black iron oxide, said iron oxide pigment having an amorphous coating of at least one electric charge modifying agent selected from the group of inorganic materials consisting of Mg, Ca, Ba, Sr, Ti, V, Zr, Cr, Mn, Fe, Co, Ni, Cu, Zn, Si and Al and at least one dispersion promoting agent selected from the group of organic materials consisting of stearates, acetates, alkylphenols, cellulosics, waxes, lignins, acrylics, epoxies, urethanes, ethylenes, styrenes, propylenes and polymers having functional groups of alcohols, glycols, aldehydes, amides and carboxylic acids.

46. The surface modified iron oxide pigment according to claim 45, wherein said at least one electric charge modifying agent is selected from the group of inorganic materials consisting of Mg, Ca, Zr, Fe, Si and Al.

47. The surface modified iron oxide pigment according to claim 41, wherein said at least one electric charge modifying agent is Mg.

48. The surface modified iron oxide pigment according to claim 46, wherein said at least one electric charge modifying agent is Si.

49. The surface modified iron oxide pigment according to claim 46, wherein said at least one electric charge modifying agent is Al.

50. The surface modified iron oxide pigment according to claim 46, wherein the at least one dispersion promoting agent is selected from the group consisting of stearates, alkylphenols, lignins, acrylics, ethylenes and polymers having functional groups of alcohols, glycols, aldehydes and carboxylic acids.

51. The surface modified iron oxide pigment according to claim 50, wherein the at least one dispersion promoting agent is lignosulfonate.

52. The surface modified iron oxide pigment according to claim 50, wherein the at least one dispersion promoting agent is polyacrylate.

53. The surface modified iron oxide pigment according to claim 50, wherein the at least one dispersion promoting agent is stearate.

54. The surface iron oxide pigment according to claim 46, wherein said electric charge modifying coating is about 0.01–20% by weight of the pigment particle and said dispersion promoting coating is about 0.01–20% by weight of the pigment particle.

55. The surface modified iron oxide pigment according to claim 46, wherein said iron oxide has an average primary particle size of 0.01–100 microns.

56. The surface modified iron oxide pigment according to claim 46, wherein said surface modified iron oxide is in a granular form and has an average bulk particle size in the range of 25 to 250 microns and a water content of less than 5%.

57. The surface modified iron oxide pigment according to claim 56, wherein said surface modified iron oxide has an average bulk particle size in the range of 100 to 200 microns and a water content of less than 2%.

58. The surface modified iron oxide pigment according to claim 46, wherein the surface modified iron oxide is in powder form.

59. The surface modified iron oxide pigment according to claim 46, wherein the surface modified iron oxide is in dispersion form.

60. The surface modified iron oxide pigment according to claim 46, further comprising at least one additive selected from the group consisting of stabilizers, dispersants, biocides, wetting agents, rheology modifiers, fillers, lubricants, plasticizers, plastisols, propellants and gas entrainment agents.

61. The surface modified pigment particle according to claim 22, wherein the metal oxides are selected from the group consisting of iron oxide, aluminum oxide, chromium oxide, lead oxide, nickel oxide, silicon oxide, silver oxide, tin oxide, titanium oxide, zinc oxide and zirconium oxide.

62. The surface modified pigment particle according to claim 22, wherein the at least one electric charge modifying agent is an inorganic material selected from the group consisting of Mg, Ca, Zr, Fe, Si and Al and at least one dispersion promoting agent is selected from the group consisting of stearates, alkylphenols, lignins, acrylics, ethylenes and polymers having functional groups of alcohols, glycols, aldehydes, and carboxylic acids.

63. The method according to claim 32, wherein the at least one electric charge modifying agent is an inorganic material selected from the group consisting of Mg, Ca, Ba, Sr, Ti, V, Zr, Cr, Mn, Fe, Co, Ni, Cu, Zn, Si and Al, and the at least one dispersion promoting agent is an organic material selected from the group consisting of stearates, acetates, alkylphenols, cellulosics, waxes, lignins, acrylics, epoxies, urethanes, ethylenes, styrenes, propylenes and polymers having functional groups of alcohols, glycols, aldehydes, amides and carboxylic acids.

64. The method according to claim 63, wherein the pigment particles are metal oxides.

65. The method according to claim 64, wherein the pigment particles are iron oxides.

66. The colored cementitious composition according to claim 41, wherein the pigment particles are iron oxides selected from the group consisting of red, yellow and black iron oxides.

67. The colored cementitious composition according to claim 66, wherein the at least one electric charge modifying agent is an inorganic material selected from the group consisting of Mg, Ca, Ba, Sr, Ti, V, Zr, Cr, Mn, Fe, Co, Ni, Cu, Zn, Si and Al and the at least one dispersion promoting agent is an organic material selected from the group consisting of stearates, acetates, alkylphenols, cellulosics, waxes, lignins, acrylics, epoxies, urethanes, ethylenes, styrenes, propylenes and polymers having functional groups of alcohols, glycols, aldehydes, amides and carboxylic acids.

68. The colored cementitious composition according to claim 67, wherein the at least one electric charge modifying agent is Mg and the at least one dispersion promoting agent is lignosulfonate.

69. The magnetic toner composition according to claim 42, wherein the pigment particles are black iron oxides.

70. The magnetic toner composition according to claim 69, wherein the at least one electric charge modifying agent is an inorganic material selected from the group consisting of Mg, Ca, Ba, Sr, Ti, V, Zr, Cr, Mn, Fe, Co, Ni, Cu, Zn, Si and Al and the at least one dispersion promoting agent is an organic material selected from the group consisting of stearates, acetates, alkylphenols, cellulosics, waxes, lignins, acrylics, epoxies, urethanes, ethylenes, styrenes, propylenes and polymers having functional groups of alcohols, glycols, aldehydes, amides and carboxylic acids.

71. The magnetic toner composition according to claim 70, wherein the at least one electric charge modifying agent is Al and the at least one dispersion promoting agent is a stearate.

* * * * *

UNITED STATES PATENT AND TRADEMARK OFFICE
CERTIFICATE OF CORRECTION

PATENT NO. : 5,401,313
DATED : March 28, 1995
INVENTOR(S) : William W. Supplee, et. al.

It is certified that error appears in the above-indentified patent and that said Letters Patent is hereby corrected as shown below:

Column 14, claim 5, line 27, delete the word "aluminares" and substitute therefor -- aluminates --.

Column 17, claim 47, line 22, delete "41" and subsitutute therefore--46--.

Signed and Sealed this

Eleventh Day of July, 1995

Attest:

BRUCE LEHMAN

*Attesting Officer*     *Commissioner of Patents and Trademarks*